Oct. 20, 1970  JAMES E. WEBB  3,535,024
ADMINISTRATOR OF THE NATIONAL AERONAUTICS
AND SPACE ADMINISTRATION
INTERFEROMETER SERVO SYSTEM
Filed April 4, 1968  2 Sheets-Sheet 2
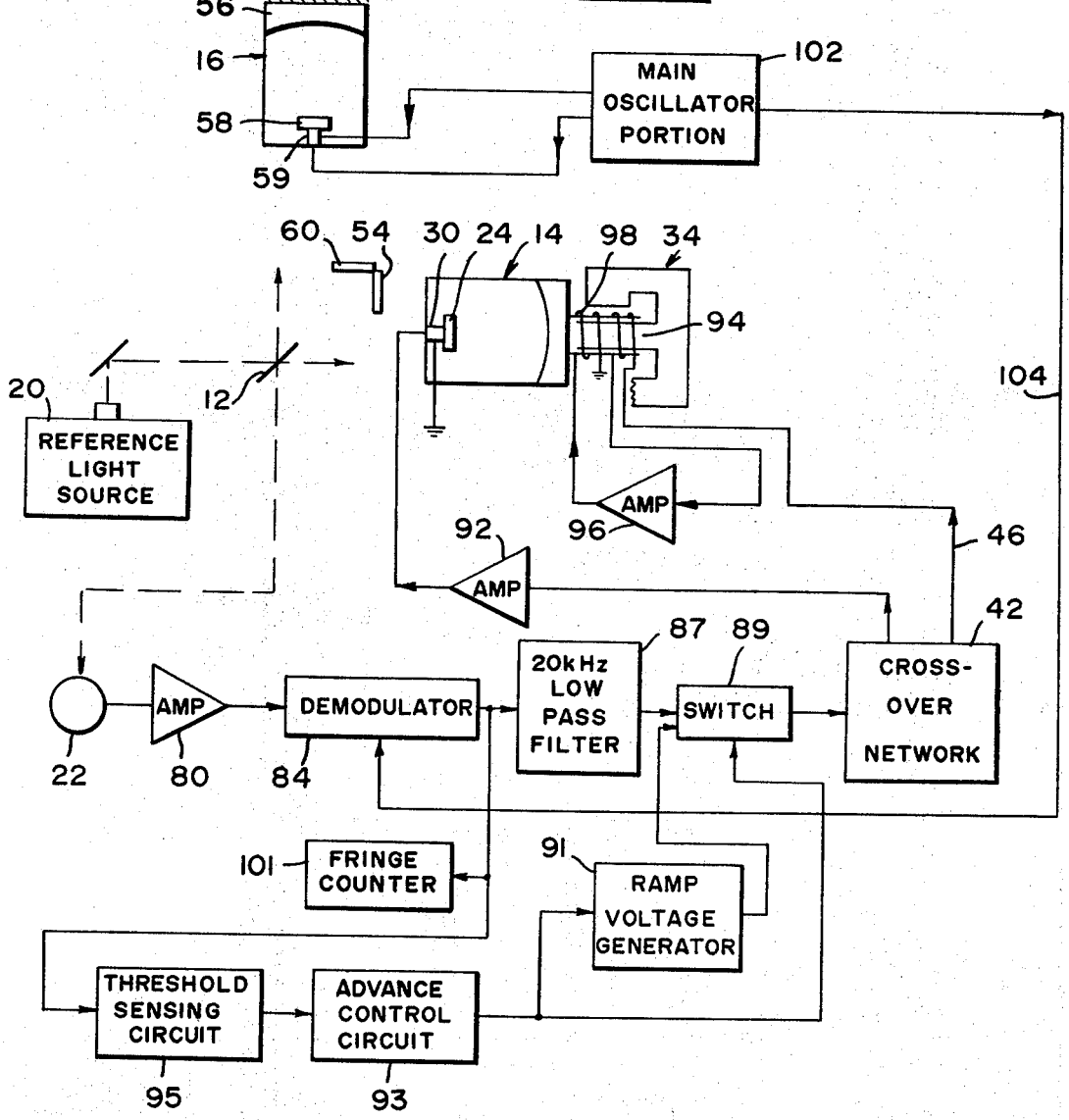
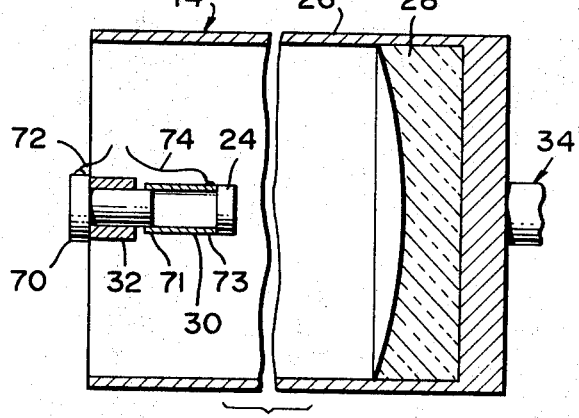
RUDOLF A. SCHINDLER
INVENTOR.
BY
ATTORNEYS United States Patent Office 3,535,024
Patented Oct. 20, 1970

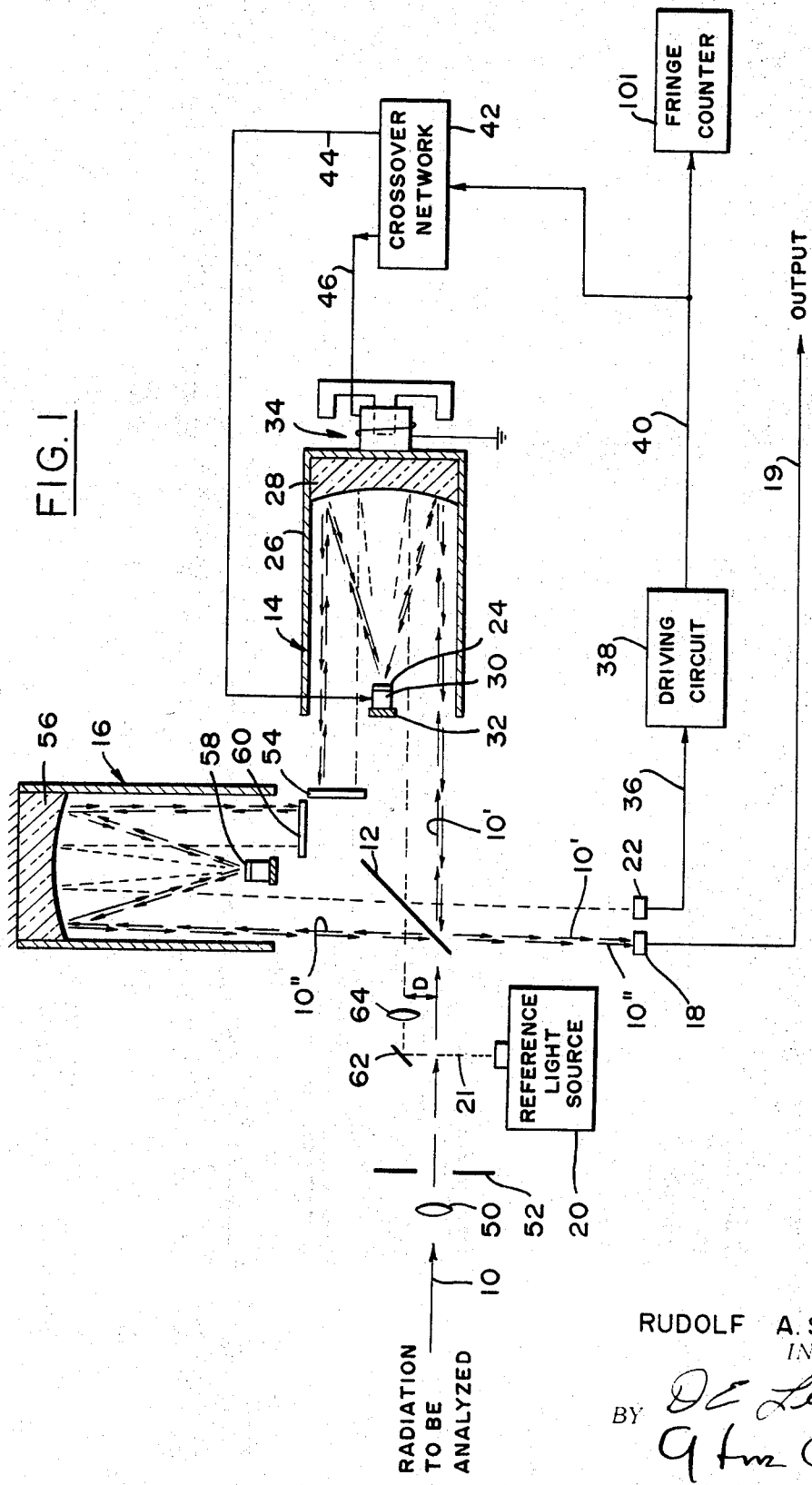

3,535,024
INTERFEROMETER SERVO SYSTEM
James E. Webb, Administrator of the National Aeronautics and Space Administration, with respect to an invention of Rudolf A. Schindler, Pasadena, Calif.
Filed Apr. 4, 1968, Ser. No. 718,769
Int. Cl. G02f 1/34; G01p 9/02
U.S. Cl. 350—285         4 Claims

ABSTRACT OF THE DISCLOSURE

A servo system is disclosed for enabling the more rapid response of an interferometer of a type which includes a cat's eye retroreflector having a large primary mirror and small secondary mirror. The secondary mirror is mounted on a piezoelectric transducer for rapid movement relative to the primary mirror to enable a rapid change in the effective position of the retroreflector. Error correcting signals are passed through a crossover network so that only high frequency components are delivered to the secondary mirror transducer, while low frequency components are delivered to an actuator which moves the entire retroreflector including the primary and secondary mirrors.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to interferometers and, more particularly, to interferometers of the type utilizing cat's eye retroreflectors.

Interferometers are instruments which can be used to measure a linear distance with great accuracy, or, conversely, to measure the wavelength of radiation with great accuracy. The Michelson interferometer is a well known type which splits the incoming light beam into two beam portions by means of a semireflecting surface so that the two portions can travel over two different paths. It then recombines the two beam portions after they have been reflected by separate plane mirrors, to produce fringes.

Proper operation of the basic Michelson interferometer requires that the alignment of the plane mirrors be maintained to within approximately a second of arc. This alignment is difficult to maintain when one of the mirrors is moved along the normal to its surface, which is the case in most interferometers.

An improved interferometer utilizes corner cube reflectors in place of the plane mirrors, in order to return the beams in a direction parallel to their directions of incidence. Such devices are referred to as retroreflectors. The cube-corner retroreflector retuns a beam in pecisely the same direction as the incoming beam in spite of angular misalignments. However, difficulty is encountered in producing cube retroreflectors because the three perpendicular plane mirrors comprising the cube corner must be perpendicular within a second of arc or less.

Another type of retroreflector for use in interferometers is a cat's eye retroreflector. The cat's eye consists of a parabolic primary mirror and a flat secondary mirror positioned at the focus of the primary. The cat's eye retroreflector shares the advantage of the cube reflector in that it is tolerant to moderate misalignments and has the further advantage that it is much easier to manufacture.

With the advent of retroreflectors, the use of interferometers under non-laboratory conditions is possible. One such application is in a spacecraft for the spectral analysis of infrared radiation from other planets. However, in the spacecraft environment, the interferometer is subject to vibrations which could seriously degrade its performance. The effects of low frequency vibrations can be compensated by a servo system which moves the cat's eye or corner cube reflector back and forth so as to maintain a predetermined optical path difference. This predetermined optical path difference is determined by a separate, visible, monochromatic light beam which produces interference fringes whose amplitude varies sinusoidally as one of the retroreflectors is moved. The servo nulls (produces no error-correcting signal) on a particular portion of the sinusoid, for instance the trough. The optical path difference can be changed by overriding the servo system until approximately the trough of the next fringe is reached, and then nulling the servo system to the next fringe.

While an ordinary reflector with a servo drive can be used to compensate for low frequency vibrations, such a system generally cannot correct for high frequency vibrations. High frequency vibrations cannot normally be compensated because both corner cube and cat's eye retroreflectors are usually too heavy to be moved with sufficient speed. Also, there is a degree of elasticity of the heavy mounting structure which results in relatively low natural frequencies of vibration. Therefore, resonances of low frequencies occur when the system is driven at frequencies approaching the natural frequency. It is virtually impossible to stabilize a servo system wherein such a resonance exists. The inability to rapidly move the retroreflector also limits the rate at which a series of measurements can be made which require numerous changes of the optical path length difference.

OBJECTS AND SUMMARY OF THE INVENTION

One object of the present invention is to provide an interferometer capable of performing satisfactorily when subjected to vibrations having a wide frequency spectrum.

Another object of the invention is to provide an interferometer for measuring the different wavelength components of radiation which will operate at a greater speed than interferometers available heretofore.

In accordance with the present invention, there is provided an interferometer of the Michelson type, in which a cat's eye retroreflector is used as the means for reflecting radiation toward a fringe detector. The cat's eye retroreflector is of the usual type with a parabolic primary mirror held in a cat's eye mounting. It also includes a small flat secondary mirror which, in accordance with the present invention, is mounted so that it can be moved rapidly relative to the primary mirror.

In accordance with a preferred embodiment of the invention, the secondary mirror is mounted on a piezoelectric transducer which, in turn, is mounted on a spider type support that extends across the view of the primary mirror. When a voltage is applied to the piezoelectric transducer, it moves the secondary mirror toward or away from the primary, thereby changing the effective position of the retroreflector. The movement of the secondary mirror can be accomplished extremely rapidly, as compared with the time required to move the entire cat's eye including the primary mirror, because the secondary mirror normally has a mass on the order of $\frac{1}{1000}$th that of the primary mirror.

The foregoing cat's eye retroreflector finds an important use in a servo system for an interferometer to enable rapid control of the effective position of the retroreflector. The position of the retroreflector is varied to cancel the effects of vibrations and to make desired changes in the length of the optical path. In addition to rapid movements over short distances, which can be accomplished by the piezoelectric mounting on the secondary, the servo system generally also must have a capability for relatively large movement. The large movements can only be accomplished by gross movements of the entire retroreflector, including the primary and its mounting. However, problems are encountered in assuring that the secondary mirror transducer is not driven to one extreme position by large position-correcting signals before the entire cat's eye retroreflector can be moved. If the transducer is driven to one extreme position, it cannot thereafter provide rapid corrections of small errors in position.

In accordance with one embodiment of the invention, a cross-over network is provided which transmits only high frequency error signals to the secondary mirror transducer. Lower frequency correction signals are transmitted to the primary actuator, such as a loudspeaker type coil, which moves the entire cat's eye mounting. As a result, any large correction signals which are rapidly applied cause the secondary mirror transducer to perform the fist correction while the pimary actuator begins to move the entire mounting. The primary actuator continues to move the entire mounting until the entire correction has been made. By the time the entire correction is made, the secondary mirror transducer has reverted back to its center position and is ready to receive the next high frequency signal. Thus, the system reacts rapidly and can also make large corrections.

The novel features of the invention are set forth with particularity in the appended claims. The invention will best be understood from the following description when read in conjunction with the accompanying drawings.

BRIEF DESCRIPTION OF THE DRAWINGS

FIG. 1 is a diagram of an interferometer servo system constructed in accordance with the invention;

FIG. 2 is a sectional view of the cat's eye retroreflector of FIG. 1; and

FIG. 3 is a block diagram of a servo system constructed in accordance with the invention.

DESCRIPTION OF THE PREFERRED EMBODIMENTS

FIG. 1 is an illustration of an interferometer spectrometer which is useful for analyzing radiation, indicated at 10, having a frequency of visible light or infrared. The apparatus can determine the amplitude of radiation components of various optical frequencies with high precision. Such a determination is made by detecting the amplitude of a fringe created at a photodetector 18, and measuring the amplitude for various path length differences in the interferometer. The components of various frequencies in the radiation 10 are determined by utiliziing a Fourier transformation of the output amplitude of the detector 18 versus optical path difference. In accordance with the invention, the apparatus is constructed to operate under adverse conditions where it may be subjected to vibrations.

Basically, the apparatus comprises a beamsplitter 12 which allows half of the radiation 10 to pass through to a first retroreflector 14 and the other half to a second retroreflector 16. The retroreflectors return the two beams to the beamsplitter and the composite beam resulting from the recombination of the two beams falls on photodetector 18. The difference in path length for the light beams directed to the retroreflectors 14 and 16 causes the generation of fringes at the plane of the photodetector 18, the photodetector covering only a small portion of one fringe area.

A determination of the exact difference between the two paths is made by the use of a reference monochromatic light source 20, such as a helium-neon laser or mercury-discharge lamp. The light 21 from the reference source 20 is projected through the same optical system in parallel with the radiation 10 to be analyzed, but is laterally displaced from it by a distance D. This causes the recombined beam from the reference light source to fall upon another photodetector 22 which is a reference photodetector that also covers a small area.

Changes in optical path difference, generally due to movement of retroreflector 14, cause the fringe areas of maximum amplitude to pass across the reference photodetector. The change in path difference between the appearance of fringe maxima is equal to the wavelength of the monochromatic light source. A fringe counter 101 is utilized to count the number of fringes that have been passed. This makes it possible to determine the precise total optical path difference, measured from an arbitrary starting point, at which each radiation measurement was made. This information could also be used to control a machine tool or measure distances exactly. In the interferometer spectrometer, it is necessary to know the total optical path difference for each point at which the output from the main photodetector 18 is taken. This information is required in order to construct the Fourier transformation of the radiation data (called an interferogram) into a spectral output which indicates the radiation intensity at each wavelength.

In order to make an interferogram of the radiation 10, the difference in path length for the two beam portions passing to the retroreflectors 14 and 16 is repeatedly changed. This can be done by starting the measurement with the first retroreflector 14 in one position where the path lengths are identical and repeatedly moving the retroreflector 14 toward the beamsplitter 12. In a typical system the first retroreflector 14 may be moved in 75,000 steps, each step resulting in an increase of path difference of one reference wavelength. A measurement of the output from the main photodetector 18 is taken after each step. In order to make a measurement within a reasonable time, the effective position of the retroreflector 14 must be changed very rapidly. In addition to the need for rapid stepping, rapid control of the effective retroreflector position is required to cancel the effect of vibrations which may be encountered in the operating environment.

The retroreflector 14 is a cat's eye type which includes a large parabolic primary mirror 28, and a small secondary mirror 24 which faces the primary to reflect light back at it. In accordance with the invention, rapid changes in the effective position of the retroreflector 14 can be made because the small secondary mirror 24 is not rigidly mounted on the cat's eye mounting 26, which holds the primary mirror 28. Instead, the secondary 24 is mounted on a piezoelectric transducer 30. The transducer is attached to a spider 32 which is fixed to the mounting 26. The effective position of the entire first retroreflector 14 can be changed, within a limited range, by movement of only the secondary 24. This is accomplished by voltages applied to the piezoelectric transducer 30. Since the secondary 24 typically weighs only on the order of 70 milligrams, its position can be readily altered by voltages applied to the transducer. Where large movements of the retroreflector 14 are required, the entire retroreflector 14 can be moved with a primary moving means or actuator comprising a moving coil actuator 34 which is attached to the mounting 26.

The effective position of the first retroreflector 14 with respect to the second 16 is monitored by the reference photodetector 22. Its output 36 is delivered to a driving circuit 38 for generation of correction or driving signals on an output 40. These signals command the movement of the first retroreflector 14. The driving signals are delivered to a crossover network 42 which separates the high frequency components from the lower frequency components.

The crossover network 42 has a high frequency output 44 which carries only driving signal components of more than a predetermined frequency such as 100 Hz. This high frequency output is applied to the transducer 30 to expand or contract it and thereby move the secondary mirror 24 toward or away from the primary 28. The other output 46 of the crossover network contains the low frequency portion of the driving signal. The low frequency signals are applied to the moving coil actuator 34 to move the cat's eye mounting 26, and thereby move the entire first retroreflector 14, including the secondary mirror 24.

Instead of applying only the low frequency components of the driving signal to the actuator 34, both the high frequency and low frequency components could be applied to it. The moving coil actuator has a response on the order of 100 Hz., so it effectively filters out high frequency components by its inability to respond to them. Accordingly, the crossover network 42 could be dispensed with and only a high pass filter employed for the piezoelectric transducer. However, it is generally preferable to include a crossover network to provide a smooth transition in overall response to signals near the 100 Hz. frequency. Such crossover networks are extensively used in high fidelity sound systems to provide smooth amplitude and phase transition in driving "woofer" and "tweeter" loudspeakers.

With the apparatus of FIG. 1, even large and rapidly applied driving signals are quickly responded to. The leading edge of a large driving signal is essentially a high frequency component which is delivered to the transducer 30. Thus, the secondary mirror 24 immediately begins to move in response to large driving signals. The moving coil actuator 34 also begins to respond, and it is capable of moving large distances, on the order of an inch. The piezoelectric transducer 30 is seldom overloaded, because the transducer begins to relax as soon as the high frequency components die out. As the transducer 30 relaxes to its initial position, lower frequency driving signals are created which tend to drive the moving coil actuator 34 to compensate for the relaxation of the piezoelectric transducer. When a steady state position is reached, the piezoelectric transducer 30 will have no voltage on it, and only the moving coil actuator 34 will have experienced a net change of position.

A more detailed description of the entire interferometer apparatus of FIG. 1 will aid in understanding the invention. The radiation to be analyzed 10 passes through a collimator containing a lens 50, and through an aperture in a stop 52 that limits the beam size. The radiation 10 then reaches the beamsplitter 12. Typically, the beamsplitter is a cube formed by two right-angle prisms with their hypotenuse surfaces joined, and with a semi-reflecting coating on one of the joined surfaces.

The beamsplitter 12 passes approximately 50% of the radiation to allow it to reach the first retroreflector 14. The other 50% of the radiation is reflected toward the second retroreflector 16. The radiation 10', which continues towards the first retroreflector 14, strikes the primary mirror 28, is reflected toward the secondary 24, is again reflected toward the primary 28, and is then reflected to an end mirror 54, which is totally reflective. The end mirror 54 reflects the beam in the same direction from which it is received, so that it again strikes the primary 28, secondary 24, primary 28, and then the beamsplitter 12. The returning radiation beam 10', which returns to the beamsplitter 12, is reflected downwardly toward the main photodetector 18.

The portion of the radiation 10 which is initially reflected by the beamsplitter 12 toward the second retroreflector 16 is designated 10''. This beam passes toward the primary 56 of the second cat's eye retroreflector, and is reflected toward the secondary 58, back toward the primary and then toward a second end mirror 60. The end mirror 60, which is totally reflective, returns the beam over the same path to the beamsplitter 12. This beam 10'' passes through the beamsplitter and is incident on the main photodetector 18. Thus, the light incident on the main photodetector 18 includes two beam portions which may have a different path length, giving rise to fringes on the photodetector surface. The location of the fringes created in the plane of the main photodetector 18 affects the output 19 from the detector.

The difference in path length between the two beams 10' and 10'' is monitored by the reference photodetector 22, as described above. In particular, the output 21 of the monochromatic reference source 20 is reflected by a mirror 62, passes through a collimating lens system indicated at 64, and is split into two beam portions by the beamsplitter 12. The two beam portions of the reference beam undergo the same reflections as the radiation 10 to be analyzed. However, since the reference beam is displaced a distance D from the radiation 10, it can be separately detected by the reference photodetector 22.

As mentioned above, the wavelength of the reference beam 21 is known with high precision. Accordingly, the difference in path lengths for light passing to the two different retroreflectors 14 and 16 can be known precisely by measuring the fringes at the reference photodetector 22. If vibrations occur which cause movement of one of the retroreflectors relative to the other along the optical path, the output 36 from the reference photodetector causes the driving circuit 38 to generate a correcting signal. Because of the provision of a transducer 30 for moving only the secondary mirror 24, the interferometer constructed in accordance with this invention allows rapid response to any error-correcting or driving signal.

A fringe counter 101 is provided which is actuated by the driving circuit 38. This fringe counter 101 counts the total number of fringes that have been passed since the initial position, in order to determine the total optical path difference traversed. The output 19 from the main photodetector, plus the count on the fringe counter 101 at the time the main detector is read out, allows the analysis of the radiation 10.

FIG. 2 is a more detailed view of the retroreflector 14 of FIG. 1, showing its mechanical details. The cat's eye mounting 26 is a tube having a base portion upon which the primary 28 is mounted. The spider 32 is a rod of quartz or the like which extends across a diameter of the mounting at its outer end. A transducer support 70 of brass or other metal is firmly attached to the spider. The piezoelectric transducer 30 is in the form of a small thin tube, one end 71 of which is attached to the transducer support 70. The secondary mirror 24 is mounted at the other end 73 of the transducer. Electrical conductors 72 and 74 are attached to the transducer support 70 and the mirror end 73, respectively, of the transducer. Voltages applied between the two conductors 72 and 74 cause constriction and elongation of the transducer, and consequent movement of the secondary mirror 24 relative to the primary 28. The conductors 72 and 74 generally extend along the spider 32 to points outside of the mounting.

FIG. 3 is a block diagram of a servo system for maintaining the optical path difference between the two retroreflectors at a constant value. The secondary mirror 58 of the fixed retroreflector 16 is mounted on a transducer 59 which is of the same type as the piezoelectric transducer 30 described previously. It is part of a self-resonant oscillator circuit including a main oscillator portion 102, similar to a conventional crystal oscillator circuit. The mirror resonates at a frequency of 500 kHz. at an amplitude of about 50 angstroms, and consequently modulates the optical path difference at this frequency. When the servo system is at a null, that is to say at the desired position, the fringe amplitude of the reference beam is a minimum. At such a minimum, the reference photodetector 22 produces an output due to the 500 kHz. path difference modulation, which contains only second harmonic and higher even numbered harmonics of the 500 kHz. signal. If the servo, however, is not at a null, a 500 kHz. signal will appear at the output of reference photodetector 22, the phase of this 500 kHz. signal depending upon which side of the minimum position the mirror is on.

The output of reference photodetector 22 is amplified by an AC amplifier 80 and is then demodulated by a balanced, phase sensitive demodulator 84 to obtain the sense or direction in which the correcting signal must be applied. The demodulation reference for 84 is obtained over line 104 from the main oscillator portion 102 of the oscillator circuit. Ideally, the output of 84 will be positive if the photodetector signal and the reference signal are in phase, and negative if they are out of phase. Which phase the photodetector signal has depends, of course, upon the side of the null position at which the system is operating. After demodulation, the signal is passed through a low-pass 20 kHz. filter 87 to remove any of the 500 kHz. or other higher order harmonic components resulting from the demodulation process. The ouput of the low pass filter 87 passes through a switch 89 to the crossover network 42.

The crossover network 42 separates the low frequency and high frequency components of the error signal. The high frequency component is delivered to a voltage amplifier 92 having a voltage swing capability of ±100 volts and then is delivered to the secondary mirror transducer 30. The low frequency component is delivered over line 46 to a power amplifier 96 and then is fed to the drive coil 98 of the actuator. A velocity pickoff coil 94 is placed in series with the input to the power amplifier to provide velocity damping of the moving retroreflector 14. The use of local velocity feedback is required to obtain stability of the servo loop and also to increase the resistance of the servo to external vibration. Also, in some applications, the use of local velocity feedback eliminates the need for an actual crossover network because the velocity response characteristics of the actuator are equivalent to the characteristics of a low-pass filter.

A necessary part of a practical interferometer system is a means of driving the servo from one fringe null or lockup position to the next null position. The switch 89, whose output is delivered to the crossover network, has another input connected to a ramp voltage generator 91. A signal from an advance control circuit 93 causes the ramp generator 91 to start generating a ramp voltage at the same time as the switch 89 delivers only the ramp voltage to the crossover network. The ramp causes the optical path difference to be changed at a continuous rate. When the next null position is reached, the output of the phase demodulator 84 (which is now disconnected from the crossover network) activates a threshold sensing circuit 95 such as a Schmitt trigger, which deactivates the advance control circuit 93 to allow the filtered output of the demodulator to again enter the crossover network 42.

An interferometer servo system has been designed in accordance with the above for use on a spacecraft to measure the radiation components of radiation from the earth or other planets. The apparatus is designed to obtain an interferogram with measurements at 75,000 different positions of the first retroreflector 14 during a period of 150 seconds. This requires a stepping rate of 500 steps per second, each step being ¼th the wavelength of the reference source (the path length changes by four times the change in position of a retroreflector in the particular interferometer described herein). The transducer 30 of the first retroreflector was designed to move up to eight steps, with each step being a quarter wavelength of the reference source (which had a wavelength $\lambda = 6328$ A.) before the maximum piezoelectric voltage was reached. Normally, after two or three of such steps, occurring at a constant rate, the moving coil actuator 34 has accelerated the entire retroreflector to a sufficient velocity so that it lags by no more than one step. A highest frequency of 20 kHz. to the piezoelectric transducer allows the stepping to be accomplished at the required rate.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. Retroreflector apparatus for movement in response to a driving signal comprising:
   a primary mirror;
   an actuator for moving said primary mirror;
   a secondary miror having a mass which is smaller than the mass of said primary mirror;
   means for holding said secondary mirror in opposed relationship to said primary mirror, including a transducer for supporting said secondary mirror and moving it relative to said primary mirror; and
   means for coupling lower frequency components of said driving signal to said actuator and only higher frequency components of said same driving signal to said transducer, whereby the effective position of said retroreflector can be changed at moderate speeds along substantial distances and at very high speeds over limited distances.

2. The retroreflector apparatus described in claim 1 wherein:
   said means for holding said transducer is mechanically coupled to said primary mirror to move said transducer and secondary mirror with said primary mirror.

3. A cat's eye retroreflector assembly for changing effective position in accordance with driving signal comprising:
   a mount;
   a substantially parabolic primary mirror mounted on said mount;
   a transducer mounted on said mount;
   a substantially flat secondary mirror mounted on said transducer at approximately the focus of said primary mirror;
   an actuator for moving said mount, to simultaneously alter the position of said primary and secondary mirrors; and
   means for delivering high frequency components of said driving signals to said transducer and low frequency components of said driving signals to said actuator.

4. The retroreflector assembly described in claim 3 wherein:
   said means for delivering includes means responsive to disturbances in the environment of said mount for generating driving signals.

References Cited

UNITED STATES PATENTS

| 1,906,803 | 5/1933 | Mueller. | |
| 3,363,196 | 1/1968 | Eknayan | 331—94.5 |
| 3,409,375 | 11/1968 | Hubbard | 356—106 |
| 3,449,042 | 6/1969 | Auerbach | 350—266 X |

RONALD L. WIBERT, Primary Examiner

T. MAJOR, Assistant Examiner

U.S. Cl. X.R.

356—106, 112